L. A. WESTMAN.
SHAFT COUPLING.
APPLICATION FILED DEC. 23, 1908.
938,531.
Patented Nov. 2, 1909.
2 SHEETS—SHEET 1.
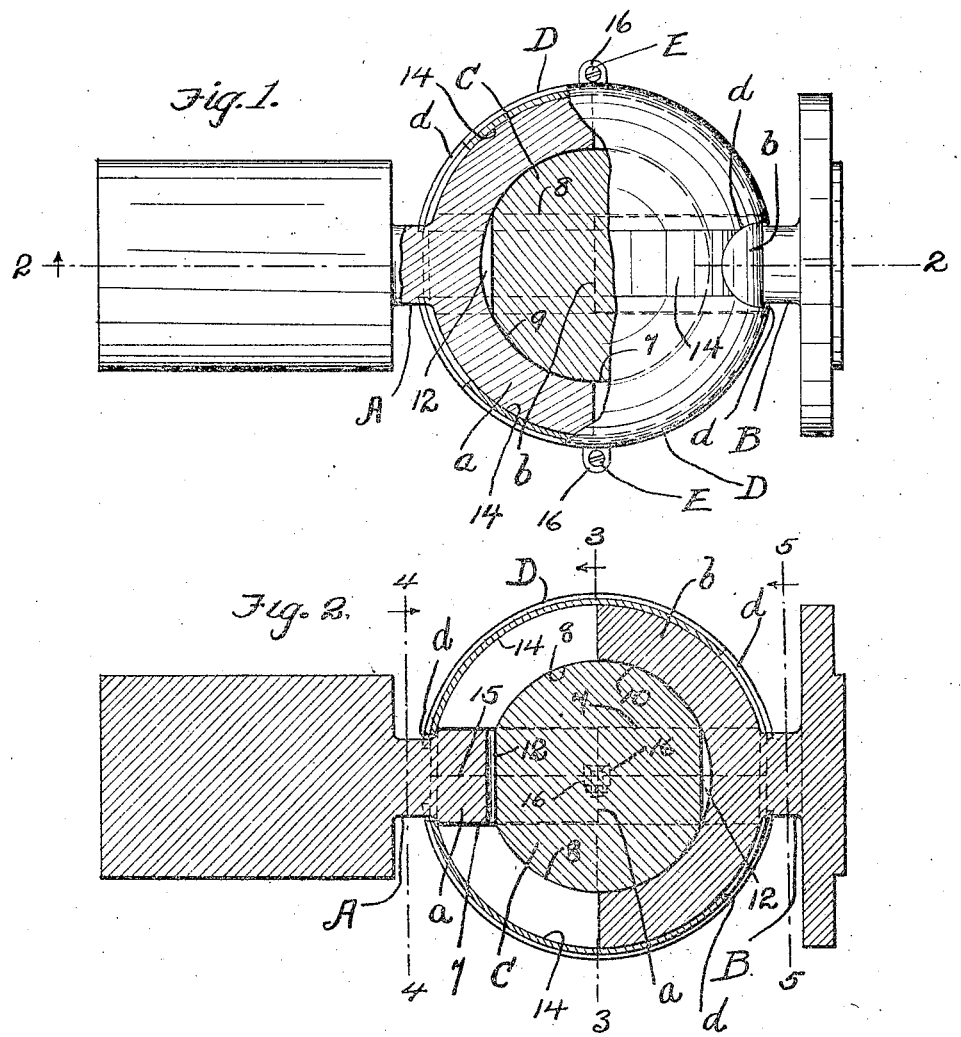
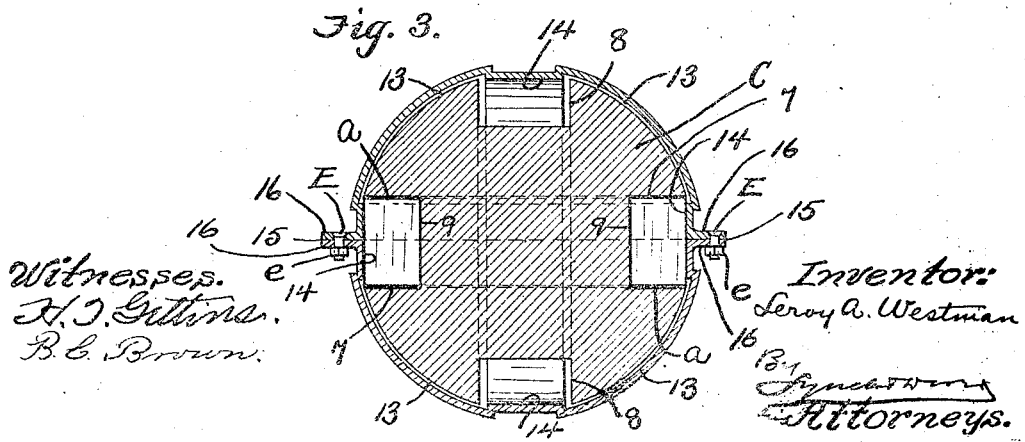

L. A. WESTMAN.
SHAFT COUPLING.
APPLICATION FILED DEC. 23, 1908.
938,531.
Patented Nov. 2, 1909.
2 SHEETS—SHEET 2.
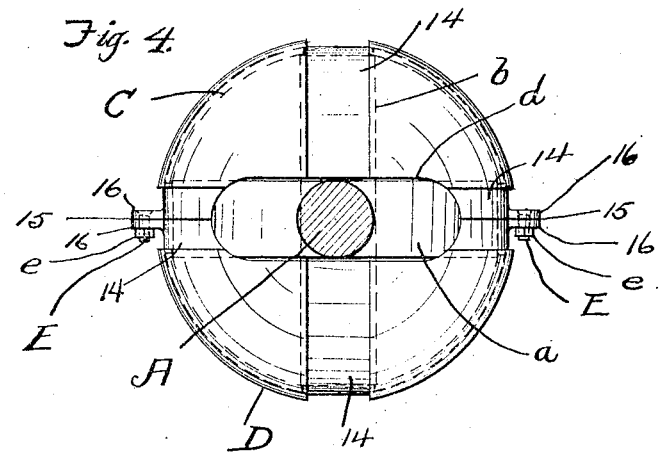
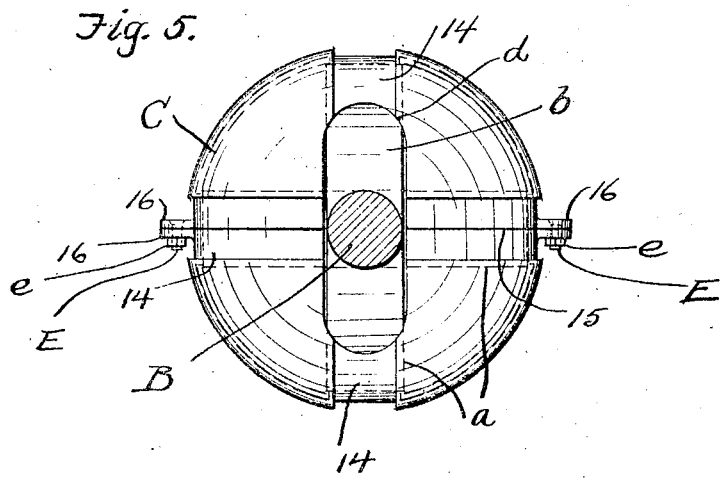
Witnesses:
H. J. Gettins
B. C. Brown
Inventor:
Leroy A. Westman
By
His Attorneys.

UNITED STATES PATENT OFFICE.

LEROY A. WESTMAN, OF CLEVELAND, OHIO.

SHAFT-COUPLING.

938,531.

Specification of Letters Patent.   Patented Nov. 2, 1909.

Application filed December 23, 1908.   Serial No. 468,894.

*To all whom it may concern:*

Be it known that I, LEROY A. WESTMAN, a citizen of the United States of America, residing at Cleveland, in the county of Cuyahoga and State of Ohio, have invented certain new and useful Improvements in Shaft-Couplings; and I do hereby declare the following to be a full, clear, and exact description of the invention, such as will enable others skilled in the art to which it pertains to make and use the same.

This invention relates to improvements in shaft-couplings for operatively connecting together two shafts or rotary parts which are adjustable at an angle to each other as well as capable of arrangement in line endwise.

The primary object of this invention is to provide a shaft-coupling of the character indicated which works easily and is simple and durable in construction.

Another object is to facilitate lubrication of the parts of the coupling and keep them well lubricated.

With these objects in view, this invention consists in certain features of construction, and combinations of parts, hereinafter described, pointed out in the claims and illustrated in the accompanying drawings.

In the said drawings, Figure 1 is a side elevation of a shaft-coupling embodying my invention, and portions are broken away and in section in this figure to more clearly show the construction. Fig. 2 is a vertical section on line 2—2, Fig. 1, looking in the direction indicated by the arrow. Fig. 3 is a transverse section on line 3—3, Fig. 2, looking in the direction indicated by the arrow. Figs. 4 and 5 are transverse sections on line 4—4 and line 5—5, respectively, Fig. 2, looking inwardly.

Referring to the drawings, A and B indicate two short shafts or shaft-sections which are to be so coupled together that they can be adjusted at different angles to each other as well as arranged in line endwise as shown.

My improved shaft-coupling formed between the shaft-sections A and B comprises a solid ball C which is provided externally with a recess 7 which extends circumferentially of the ball in one plane and another external recess 8 which extends circumferentially of the ball in a plane which is at a right angle to the first-mentioned plane. Preferably the recesses 7 and 8 are annular, extending wholly around the ball, and intersect each other at diametrically opposite points.

Two segments a and b engage and extend circumferentially of the different recesses 7 and 8 respectively and consequently extend circumferentially of the ball C and form a portion of or are operatively connected with the different shaft-sections A and B respectively. Preferably the segments a and b extend half way around the ball and have their opposite extremities arranged substantially equidistantly from the center of the shaft-sections A and B respectively.

The inner circumferentially extending surface 9 of the segment a has bearing on the opposing outwardly facing central wall of the recess 7 at opposite sides of the recess 8, and the inner circumferentially extending surface 10 of the segment b has bearing on the opposing outwardly facing central wall of the recess 8 at opposite sides of the recess 7. The outwardly facing central walls of the recesses 7 and 8 are flat widthwise of the recesses so as to form a lubricant-holding chamber 12 between the inner circumferentially extending surface of each segment and the ball where the said recesses intersect each other.

By the construction hereinbefore described it will be observed that my improved shaft-coupling comprises a ball provided with two annular recesses formed in and extending circumferentially of the ball in different planes respectively which are at a right angle to each other, and two segments engaging the different recesses respectively and extending circumferentially of the ball and forming a member of the different shaft-sections respectively, and that each segment has bearing on the opposing outwardly facing central wall of the recess circumferentially of which the said segment extends at opposite sides of the other recess circumferentially of which the other segment extends.

A spherical sheet-metal shell or casing D incases the ball C and has two slots d and d extending circumferentially of the casing and arranged to accommodate the location of the shaft-sections a and b and the adjustment of the latter at an angle to each other as well as the illustrated arrangement of the shaft-sections in line endwise. The two slots d and d are formed therefore in diametrically opposite sides of the casing and extend circumferentially of the casing in different planes respectively which are at a right angle to each other. The casing D is enough larger in internal diameter than the external diameter of the ball C at the sides of the recesses 7 and 8 and between adjacent sides of the said recesses to form lubricant-receiving chambers 13 between the external surface of the ball and the internal surface of the casing at each side of each recess and between adjacent sides of and in communication with the two recesses. It will be observed therefore that lubricant introduced into the recesses 7 and 8 of the ball through the slots d in the casing becomes distributed throughout the said recesses and connected chambers 13 between the ball and the casing and to the chambers 12 formed between the ball and the inner circumferentially extending surfaces of the segments. The casing D is pressed or projects inwardly, as at 14, at the ends of the slots d and between and a suitable distance from the side walls of the recesses 7 and 8. The two inwardly projecting portions 14 of the casing which are arranged at opposite ends respectively of a slot d extend from opposite ends respectively of the said slot in opposite directions respectively and in the direction of the other slot in the casing.

The inwardly projecting portions 14 of the casing afford bearing to the outer circumferentially extending surfaces of the segments a and b.

The casing D is divided centrally, as at 15, between the side walls of the recess 7 into two corresponding but reversely arranged sections which are provided at their adjacent ends with laterally and outwardly projecting ears 16 and removably secured together at the said ears by suitably applied bolts E and nuts e.

What I claim is:—

1. In a shaft-coupling, the combination, with a ball provided with a recess formed in and extending circumferentially of the ball in one plane and another recess formed in and extending circumferentially of the ball in a plane which is at a right angle to the first-mentioned plane, and two segments engaging and extending circumferentially of the different recesses respectively and forming a member of the different shaft-sections respectively which are to be coupled together, of a spherical casing which incases the aforesaid ball and has two slots formed in diametrically opposite sides respectively of the casing and extending circumferentially of the casing in different planes respectively which are at a right angle to each other and arranged to accommodate the location of the different shaft-sections respectively and the adjustment of the latter relative to each other, said casing being enough larger in internal diameter than the external diameter of the ball at the sides of the aforesaid recesses to form lubricant-receiving chambers between the ball and the casing at the sides of the recesses and in communication with the two recesses.

2. In a shaft-coupling, the combination, with a ball provided with a recess formed in and extending circumferentially of the ball in one plane and another recess formed in and extending circumferentially of the ball in a plane which is at a right angle to the first-mentioned plane, and two segments engaging and extending circumferentially of the different recesses respectively and forming a member of the different shaft-sections respectively which are to be coupled together, of a spherical casing which incases the aforesaid ball and has two slots formed in diametrically opposite sides respectively of the casing and extending circumferentially of the casing in different planes respectively which are at a right angle to each other and arranged to accommodate the location of the different shaft-sections respectively and the adjustment of the latter relative to each other, said casing having inwardly projecting portions overlapping and extending circumferentially of the outer circumferentially extending surfaces of the aforesaid segments.

3. In a shaft-coupling, the combination, with a ball provided with a recess formed in and extending circumferentially of the ball in one plane and another recess formed in and extending circumferentially of the ball in a plane which is at a right angle to the first-mentioned plane, and two segments engaging and extending circumferentially of the different recesses respectively and forming a member of the different shaft-sections respectively which are to be coupled together, of a spherical casing which incases the aforesaid ball and has two slots formed in diametrically opposite sides respectively of the casing and extending circumferentially of the casing in different planes respectively which are at a right angle to each other and arranged to accommodate the location of the different shaft-sections respectively and the adjustment of the latter relative to each other, said casing having inwardly projecting portions at opposite ends respectively of each slot, which portions of the casing extend from opposite ends respectively of the said slot in opposite directions respectively and in the direction of the other slot, and the inwardly projecting portions of the casing affording bearing to the outer circumferentially extending surfaces of the aforesaid segments.

4. In a shaft-coupling, the combination, with a ball provided with a recess formed in and extending circumferentially of the ball in one plane and another recess formed in and extending circumferentially of the ball in a plane which is at a right angle to the first-mentioned plane, and two segments engaging and extending circumferentially of the different recesses respectively and forming a member of the different shaft-sections respectively which are to be coupled together, of a spherical casing which incases the aforesaid ball and has two slots formed in diametrically opposite sides respectively of the casing and extending circumferentially of the casing in different planes respectively which are at a right angle to each other and arranged to accommodate the location of the different shaft-sections respectively and the adjustment of the latter relative to each other, said casing being enough larger in internal diameter than the external diameter of the ball at the sides of the aforesaid recesses to form lubricant-receiving chambers between the ball and the casing at the sides of the recesses and having inwardly projecting portions which overlap and extend circumferentially of the outer circumferentially extending surfaces of the aforesaid segments.

5. In a shaft-coupling, the combination, with a ball provided with a recess formed in and extending circumferentially of the ball in one plane and another recess formed in and extending circumferentially of the ball in a plane which is at a right angle to the first-mentioned plane, and two segments engaging and extending circumferentially of the different recesses respectively and forming a member of the different shaft-sections respectively which are to be coupled together, and each segment having bearing on the outwardly facing central wall of the recess circumferentially of which the said segment extends, of a spherical casing which incases the aforesaid ball and has two slots formed in diametrically opposite sides respectively of the casing and extending circumferentially of the casing in different planes respectively which are at a right angle to each other and arranged to accommodate the location of the different shaft-sections respectively and the adjustment of the latter relative to each other, said casing being enough larger in internal diameter than the external diameter of the ball at the sides of the aforesaid recesses to form lubricant-receiving chambers between the ball and the casing at the sides of the recesses, said casing having inwardly projecting portions affording bearing to the outer circumferentially extending surfaces of the aforesaid segments.

In testimony whereof, I sign the foregoing specification, in the presence of two witnesses.

LEROY A. WESTMAN.

Witnesses.
  C. H. DORER,
  VICTOR C. LYNCH.